July 27, 1965                 G. CHIEGER                3,197,235
           REMOVABLE SELF-STABILIZING LANDING GEAR FOR SEMI-TRAILERS
Filed Feb. 25, 1963                                 2 Sheets-Sheet 1
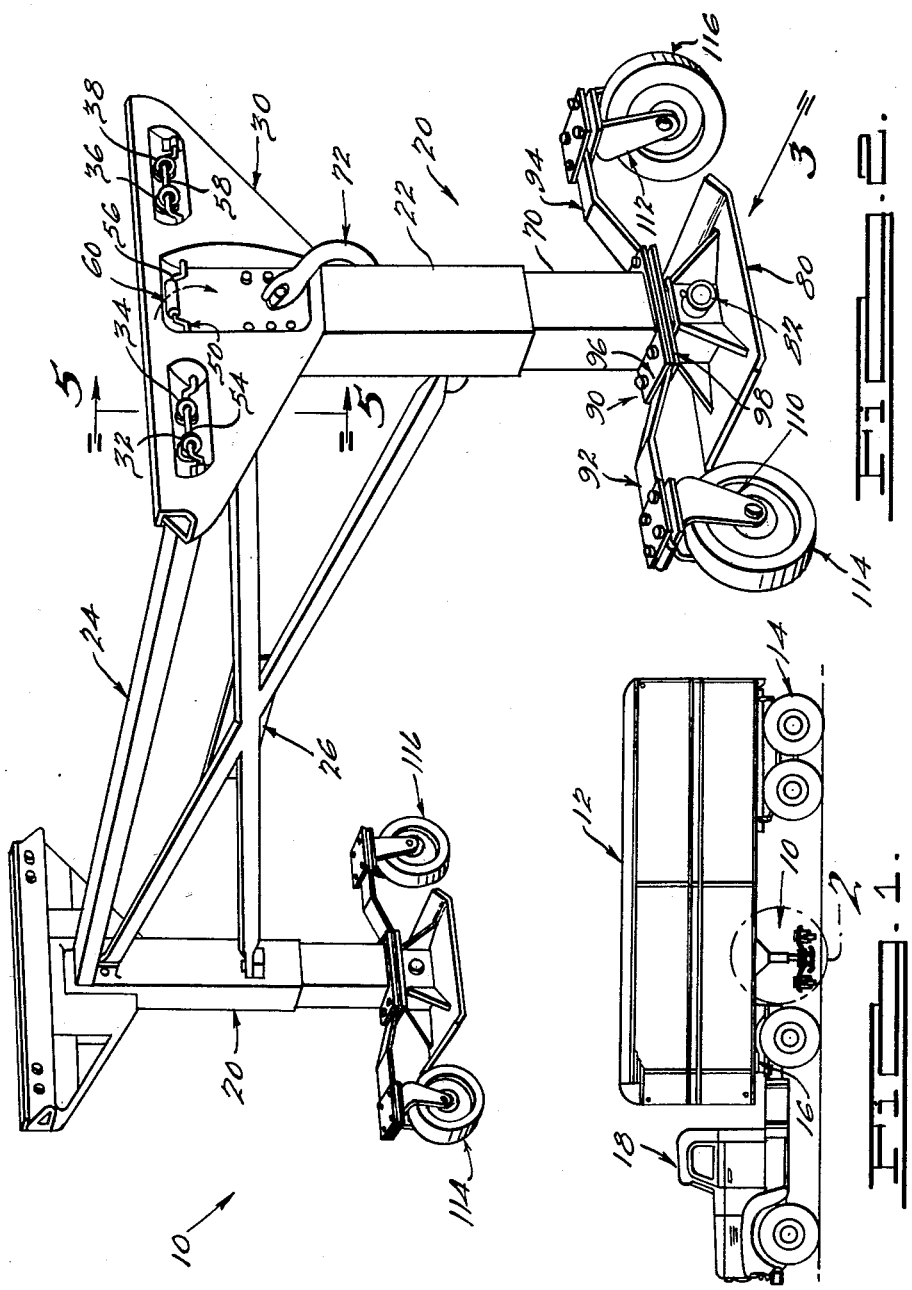
INVENTOR.
George Chieger.
BY
Harness, Dickey & Pierce
ATTORNEYS.

July 27, 1965    G. CHIEGER    3,197,235
REMOVABLE SELF-STABILIZING LANDING GEAR FOR SEMI-TRAILERS
Filed Feb. 25, 1963    2 Sheets-Sheet 2

INVENTOR.
George Chieger
BY
Harness, Dickey & Pierce
ATTORNEYS

United States Patent Office

3,197,235
Patented July 27, 1965

3,197,235
REMOVABLE SELF-STABILIZING LANDING GEAR FOR SEMI-TRAILERS
George Chieger, Grosse Pointe Woods, Mich., assignor to Fruehauf Corporation, a corporation of Michigan
Filed Feb. 25, 1963, Ser. No. 260,695
1 Claim. (Cl. 280—150.5)

This invention relates generally to support legs for semi-trailer vehicles and more particularly to an improved movable self-stabilizing support leg assembly.

Support legs for heavy-duty, over-the-road semi-trailers are, of necessity, relatively heavy and rugged in construction so as to be capable of supporting the additive weight of the trailer and a load carried therein. Preferably, such support legs support the weight of a trailer upon fixed pads having a relatively large ground-contacting surface to minimize unit stress on a supporting surface. In addition, modern trailer constructions, as well as the advent of the modular shipping container, often require that such support legs be removable from the trailer or container when it is conditioned for rail, sea, or air transportation. Support legs heretofore known and used generally have relatively small ground-contacting surfaces, are unstable upon disassociation from a trailer or container, rendering them difficult to remove from and reposition under the trailer, or require a distinct operation to condition the legs for rolling movement.

A support leg assembly in accordance with the instant invention is both self-stabilizing and self-conditioning to a rolling condition to facilitate movement relative to a shipping container. The support leg assembly is relatively easily attachable to a complementary rail structure of the container. Loads transferred from a trailer or container to the support legs are automatically transferred to support pads underlying the support legs. Upon removal of the container load from the support legs, the weight thereof is automatically transferred to a plurality of wheels which condition the support leg assembly for movement relative to the container.

Accordingly, one object is an improved support leg assembly for a semi-trailer, shipping container, or the like.

Another object is a removable support leg assembly that is self-stabilizing.

Another object is a support leg assembly that automatically transfers the weight of a container between a heavy-duty support pad and a pair of wheels.

Other objects and advantages of the instant invention will be apparent from the following specification, claims and drawings, wherein:

FIGURE 1 is a side view of a heavy-duty semi-trailer having the improved support leg assembly of the instant invention;

FIG. 2 is a perspective view taken substantially within the circle 2 of FIGURE 1;

Figure 3:
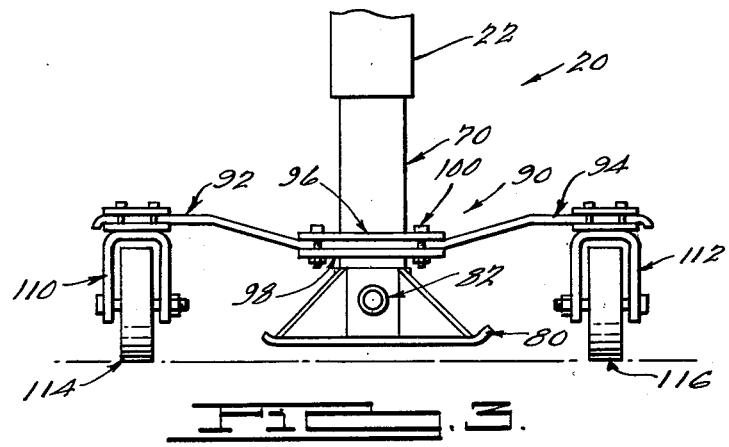
FIG. 3 is a view taken substantially in the direction of the arrow 3 of FIG. 2.

A support leg assembly 10, in accordance with an exemplary constructed embodiment of the instant invention, is shown in operative association with a conventional heavy-duty, van-type highway trailer 12. The trailer 12 has a rear wheel suspension 14, tractive effort being transmitted therethrough to a fifth wheel 16 on a tractor 18 in the conventional manner.

As best seen in FIG. 2 of the drawings, the support leg assembly 10 comprises a pair of laterally spaced legs 20 having tubular upper housings 22, respectively. The upper housings 22 of the legs 20 are connected by a pair of transverse members 24 and 26. It is to be noted that the legs 20 and structural elements associated therewith are identical except for right and left-hand orientation relative to the support members 24 and 26. Accordingly, for the purpose of simplicity and clarity, only one leg 20 and its associated structure will be described hereinafter, like legs 20 on opposite sides of the trailer van 12 forming the stabilized leg assembly 10.

Figure 5:
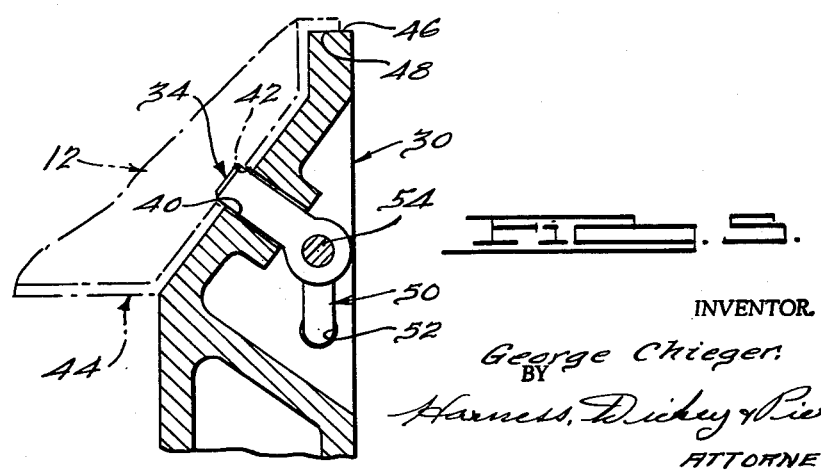
FIG. 5 is a view taken substantially along the line 5—5 of FIG. 2.

As best seen in FIG. 2 of the drawings, a head casting 30 is secured to the upper housing 22 of the leg 20 by, for example, welding. The head casting 30 supports a plurality of locking pins 32, 34, 36 and 38. As best seen in FIG. 5 of the drawings, the locking pin 34 is journaled in a complementary bore 40 in the head casting 30 so as to be slidable axially thereof into registry with a complementary aperture 42 in a cross bolster 44 of the trailer van 12. The other locking pins 32, 36 and 38 are slidably mounted in a similar manner.

An upper edge portion 46 of the head casting 30 provides a seat for a complementary flange surface 48 on the van 12 thereby to positively position the support leg assembly 10 and relative to the van 12 when the pins 32, 34, 36 and 38 are biased axially into engagement therewith.

Reciprocation of the locking pins 32, 34, 36 and 38 is effected by a crank member 50 that is journaled in a complementary bore 52 in the head casting 30. The crank member 50 has a plurality of throw portions 54, 56 and 58 that are journaled in the pins 32–34, a handle 60, and the pins 36–38, respectively. Rotation of the handle 60 downwardly, as seen in FIG. 2 of the drawings, effects retraction of the pins 32, 34, 36 and 38, conditioning the support leg assembly 10 for removal from the trailer van 12. Conversely, rotation of the handle 60 upwardly locks the pins 32, 34, 36 and 38 into the complementary apertures in the trailer van 12.

An extendable lower leg portion 70 is telescopically received in and extends downwardly from the upper housing portion 22 of the support leg 20. The lower leg portion 70 is coupled to the upper housing portion 22 as by a conventional rack and gear (not shown), rotation of a crank 72 (FIG. 2) effecting a change in elevation of the lower leg portion 70 relative to the upper housing portion 22 of the leg 20 in the conventional manner.

A foot or pad 80 is pivotally secured to a lower end of the lower leg portion 70 as by a pin 82. The foot 80 is of relatively large horizontal cross sectional areas so as to provide a firm footing with and minimize unit stress on an underlying surface when the support leg assembly 10 is in the loaded condition.

The lower leg portion 70 of the support leg 20 is provided with a spring assembly 90 comprising a pair of generally horizontally extending cantilevered leaf springs 92 and 94 on opposite sides of the lower leg portion 70. The springs 92 and 94 of the spring assembly 90 are secured to the lower leg portion 70 as by a pair of spring support plates 96 and 98, the springs 92 and 94 being retained in a sandwiched condition therebetween as by a plurality of bolts 100.

A pair of U-shaped casters 110 and 112 are pivotally secured to the springs 92 and 94 for the support of a pair of ground-contacting wheels 114 and 116. Since the wheels 114 and 116 are disposed in a generally rectangular array, as seen in FIG. 2, the support leg assembly 10 is stabilized for rollable movement.

Figure 4:
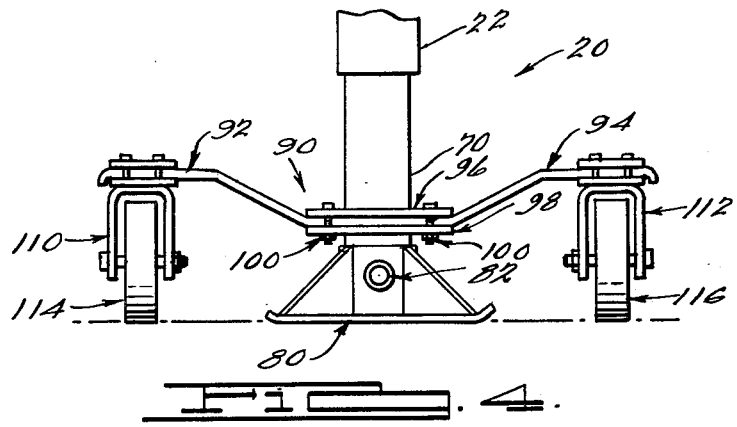
FIG. 4 is a view similar to FIG. 3 with the weight of the trailer transferred to the support pad of the support leg assembly.

As best seen by comparing FIGS. 3 and 4 of the drawings, the springs 92 and 94 of the spring assembly 90 have a normal configuration and stiffness sufficient to maintain the foot or pad 80 of the support leg assembly 10 elevated relative to the ground when the support leg assembly is not subjected to the weight of the trailer 12. However, as seen in FIG. 4 of the drawings, transfer of the load of the trailer 12 to the support leg assembly 10, as by cranking the lower leg portion 70 of the leg 20 downwardly, effects deflection of the springs 92 and 94 upwardly so as to carry the wheels 114 and 116 upwardly and transfer the load of the trailer 12 to the foot 80. When the load is removed from the support leg assembly 10, the springs 92 and 94 revert to their normal condition, as shown in FIG. 3 of the drawings, elevating the pad 80 and conditioning the support leg assembly 10 for movement relative to the trailer 12. It is to be noted that the change in condition or transfer of load between the wheels 114 and 116 and the pad 80 of the leg 20 is automatic upon vertical movement of the lower leg portion 70 relative to the upper housing 22 or by elevation of the trailer 12 and leg assembly 20 due to, for example, engagement with the fifth wheel 16 of the tractor 18.

From the foregoing description, it should be apparent that the support leg assembly 10 of the instant invention is stabilized for movement on the ground by the orientation of the wheels 114 and 116 in a generally rectangular array. Transfer of load to the support leg assembly 10 over and above its own weight effects upward deflection of the wheel supporting springs 92 and 94 and wheels 114 and 116 thereon, transferring the load to the foot portions 80 of the support legs 20. Removal of the load on the support leg assembly 10 automatically effects transfer of the weight of the leg assembly 10 to the wheels 114 and 116 thereof, conditioning the assembly 10 for movement relative to the trailer body.

It is to be understood that the specific construction of the improved support legs herein disclosed and described is for the purpose of explanation and illustration and is not intended to indicate limits of the invention, the scope of which is defined by the following claim.

What is claimed is:

A support leg assembly for a semi-trailer comprising a pair of downwardly extending elongatable legs, means for removably securing said legs to the trailer, a pair of pads having a relatively large horizontal surface area underlying said legs, respectively for transferring the load of said trailer to an underlying supporting surface, a pair of elongated cantilevered springs secured to said legs, respectively, opposite ends of said springs extending generally horizontally away from said legs, respectively, and a pair of wheels pivotally supported at the ends of said springs, respectively, so as to be disposed in a generally rectangular array, said wheels being supported for rotation about generally vertical and horizontal axes, said wheels normally being disposed relatively lower than said pads for supporting the weight of said landing gear, said springs and said wheels being deflectable vertically upward relative to said pads when the weight of the trailer is transferred thereto to transfer the weight of the trailer to the underlying surface.

References Cited by the Examiner

UNITED STATES PATENTS

| | | | |
|---|---|---|---|
| 1,400,931 | 12/21 | Barker | 254—1 |
| 2,563,927 | 8/51 | Engle | 254—1 |
| 2,840,391 | 6/58 | Stiel | 280—150.5 |
| 2,885,220 | 5/59 | Dalton | 280—150.5 |
| 3,089,711 | 5/63 | Tantlinger et al. | 280—150.5 |
| 3,101,202 | 8/63 | Tantlinger et al. | 280—150.5 X |

A. HARRY LEVY, *Primary Examiner.*

LEO FRIAGLIA, *Examiner.*